US010740702B2

(12) United States Patent
van't Westeinde (10) Patent No.: US 10,740,702 B2
(45) Date of Patent: Aug. 11, 2020

(54) METHOD, SYSTEM, AND NON-TRANSITORY COMPUTER-READABLE MEDIUM FOR REDUCING COMPUTATION TIME IN ONE-TO-MANY PATH SEARCHING USING HEURISTICS AND LIMITED BOUNDARY ADJUSTMENT

(71) Applicant: Oracle International Corporation, Redwood Shores, CA (US)

(72) Inventor: Charles Pieter van't Westeinde, Black Rock (AU)

(73) Assignee: Oracle International Corporation, Redwood Shores, CA (US)

( * ) Notice: Subject to any disclaimer, the term of this patent is extended or adjusted under 35 U.S.C. 154(b) by 1129 days.

(21) Appl. No.: 14/991,557

(22) Filed: Jan. 8, 2016

(65) Prior Publication Data
US 2017/0200131 A1 Jul. 13, 2017

(51) Int. Cl.
*G06Q 10/10* (2012.01)
*G06Q 10/06* (2012.01)
(Continued)

(52) U.S. Cl.
CPC ..... *G06Q 10/047* (2013.01); *G06Q 10/06311* (2013.01); *G06Q 10/1097* (2013.01); *G06Q 50/30* (2013.01)

(58) Field of Classification Search
None
See application file for complete search history.

(56) References Cited

U.S. PATENT DOCUMENTS 5,991,688 A * 11/1999 Fukushima ............ G01C 21/34
701/410
6,615,130 B2 9/2003 Myr
(Continued)

FOREIGN PATENT DOCUMENTS

CN 102 081 786 A 6/2006
EP 2 428 771 A1 3/2012
(Continued)

OTHER PUBLICATIONS

Dijkstra's algorithm, wikipedia webpages, Dec. 24, 2015 https://web.archive.org/web/20151224225206/https://en.wikipedia.org/wiki/Dijkstra's_algorithm.*
(Continued)

*Primary Examiner* — Octavian Rotaru
(74) *Attorney, Agent, or Firm* — Jenkins, Wilson, Taylor & Hunt, P.A.

(57) ABSTRACT

Methods, systems, and computer readable media for scheduling jobs by using a one-to-many shortest path search based on travel costs between job locations. In some examples, a system includes one or more computers configured to schedule jobs based on travel from a geographic origin to a respective geographic job location for each job. The system also includes a one-to-many path searcher implemented on the one or more computers. The one-to-many path searcher searches for paths along edges of a graph from an origin node to destination nodes by traversing intermediate nodes between the origin node and the destination nodes using travel costs, including determining heuristic travel costs based on a geographic distance between an intermediate geographic location corresponding to the intermediate node and a boundary that initially surrounds the geographic job locations.

19 Claims, 6 Drawing Sheets

(51) Int. Cl.
*G06Q 50/30* (2012.01)
*G06Q 10/04* (2012.01)

(56) References Cited

U.S. PATENT DOCUMENTS

| | | | |
|---|---|---|---|
| 6,785,608 B1* | 8/2004 | Milici | G01C 21/3446 340/995.19 |
| 8,214,527 B2 | 7/2012 | Imamura et al. | |
| 8,660,789 B2 | 2/2014 | Demiryurek et al. | |
| 8,786,605 B1* | 7/2014 | Curtis | G06Q 10/06 345/440 |
| 8,824,337 B1 | 9/2014 | Geisberger | |
| 2004/0218536 A1* | 11/2004 | Yasukawa | H04L 12/1877 370/238 |
| 2006/0047421 A1 | 3/2006 | Goldberg et al. | |
| 2007/0008949 A1* | 1/2007 | Balandin | H04L 45/02 370/351 |
| 2008/0075007 A1* | 3/2008 | Mehta | H04L 45/12 370/238 |
| 2009/0228198 A1* | 9/2009 | Goldberg | G01C 21/26 701/533 |
| 2010/0036606 A1* | 2/2010 | Jones | G01C 21/3446 701/533 |
| 2010/0082245 A1* | 4/2010 | Patenaude | G01C 21/26 701/533 |
| 2011/0302214 A1* | 12/2011 | Frye | G06F 16/24575 707/802 |
| 2012/0008526 A1* | 1/2012 | Borghei | H04W 4/021 370/254 |
| 2013/0132369 A1 | 5/2013 | Delling et al. | |
| 2013/0245940 A1* | 9/2013 | Shinagawa | G01C 21/3446 701/527 |
| 2013/0261967 A1* | 10/2013 | Shinagawa | G01C 21/34 701/533 |
| 2014/0107921 A1 | 4/2014 | Delling et al. | |
| 2014/0200807 A1* | 7/2014 | Geisberger | G01C 21/3446 701/533 |
| 2015/0095355 A1* | 4/2015 | Patton | G06F 16/29 707/754 |
| 2015/0356759 A1* | 12/2015 | Delling | G06T 11/206 345/440 |
| 2016/0350711 A1* | 12/2016 | Tsao | G06Q 10/0833 |

FOREIGN PATENT DOCUMENTS

| | | |
|---|---|---|
| EP | 2 757 504 A1 | 7/2014 |
| WO | WO-2002/059808 A1 | 1/2002 |

OTHER PUBLICATIONS

Heuristics, wikipedia, archives org, Nov 6, 2015 https://web.archive.org/web/20151106210849/https://en.wikipedia.org/wiki/Heuristic.*

Fan, Nathaniel—Dijkstra Algorithm, youtube webpages closed captioned video extract Nov. 24, 2012 https://www.youtube.com/watch?v=gdmfOwyQlcl.*

Graphs—Dijkstra Alghorithm, youtube webpages extract, uploaded Apr. 2, 2008 http://www.youtube.com/watch?v=8Ls1RqHCOPw.*

Top 10 Google search video results for Dijkstra algorithm prior to Jan. 8, 2016.*

Dijkstra's algorithm, wikipedia webpages, Dec. 24, 2015 https://web.archive.org/web/20151224225206/https://en.wikipedia.org/wiki/Dijkstra's_algorithm (Year: 2015).*

Heuristics, wikipedia, archives org, Nov. 6, 2015 https://web.archive.org/web/20151106210849/https://en.wikipedia.org/wiki/Heuristic (Year: 2015).*

Fan, Nathaniel—Dijkstra Algorithm, youtube webpages closed captioned video extract Nov. 24, 2012 https://www.youtube.com/watch?v=gdmfOwyQlcl (Year: 2012).*

Graphs—Dijkstra Alghorithm, youtube webpages extract, uploaded Apr. 2, 2008 https://www.youtube.com/watch?v=8Ls1RqHCOPw (Year: 2008).*

Top 10 Google search video results for Dijkstra algorithm prior to Jan. 8, 2016 (Year: 2016).*

Dai, L, "Fast Shortest Path Algorithm for Road Network and Implementation," Carelton University Honours Project, 2006, Ottowa, Ontario, Canada.

Koenig, S, et al. "Real Time Adaptive A*," Proceedings of the International Joint Conference on Autonomous Agents and Multiagent Systems (AAMAS). pp. 281-288, 2006, Hakodate, Japan.

Patel, A, "Heuristics," Amit's Thoughts on Pathfinding, Red Blob Games, 2016, Stanford, US.

Notification of Transmittal of the International Search Report and the Written Opinion of the International Searching Authority, or the Declaration for International Application No. PCT/US2017/012518 (dated Mar. 20, 2017).

* cited by examiner

METHOD, SYSTEM, AND NON-TRANSITORY COMPUTER-READABLE MEDIUM FOR REDUCING COMPUTATION TIME IN ONE-TO-MANY PATH SEARCHING USING HEURISTICS AND LIMITED BOUNDARY ADJUSTMENT

TECHNICAL FIELD

The subject matter described herein relates generally to scheduling jobs. More particularly, the subject matter described herein relates to methods, systems, and computer readable media for scheduling jobs by using a one-to-many shortest path search based on travel costs between job locations.

BACKGROUND

Road-mapping programs provide digital maps, often complete with detailed road networks down to the city-street level. Typically, a user can input a location and the road-mapping program will display an on-screen map of the selected location. Some road-mapping programs offer a feature to calculate a "best route" between two locations. In these programs, the user can input two locations, and the road-mapping program will compute the travel directions from the source location to the destination location. The directions can be determined based on distance, travel time, and certain user preferences, such as a preferred driving speed or a preference between highways and local roads. Computing the best-route between locations may require significant computational time and resources.

Some road-mapping programs employ variants of Dijkstra's method to compute best routes between locations. Each road segment can be assigned a cost or weight that may or may not be related to the road segment's length. By varying the way the cost is calculated for each road, best routes can be generated for the quickest, shortest, or preferred routes. Some road-mapping programs use heuristic variations of Dijkstra's method, including A* search, which is a heuristic search. Using an A* search attempts to guide the shortest-path computation in the right general direction. Such heuristic variations typically involve estimating the weights of paths between intermediate locations and the destination. For example, some heuristic variations use lower-bound estimation techniques such as straight-line Euclidean distance between locations.

One of the inputs to a job scheduling program can be a travel cost based on the travel time or distance or both between a number of jobs to be scheduled by the program. The travel cost can be determined using the Dijkstra or A* algorithms using the location of one of the jobs as an origin and the locations of the remaining jobs as destinations, and repeating the process for every job. In situations where many jobs must be scheduled, determining the travel cost for the jobs can require a massive amount of computing resources, and the total computing time can prohibit effective job scheduling by taking too long.

Accordingly, in light of these difficulties, there exists a need for methods, systems, and computer readable media for scheduling jobs by using a one-to-many shortest path search based on travel costs between job locations.

SUMMARY

The subject matter described herein relates to methods, systems, and computer readable media for scheduling jobs by using a one-to-many shortest path search based on travel costs between job locations. By using a graph search, e.g., an A* search, starting at an origin node and using the distance to a boundary surrounding the not yet reached destination nodes as a heuristic travel cost, a computer system can reduce the time taken to calculate the travel costs associated with various jobs. The computer system can reduce the number of computing resources required, which can reduce, for example, scheduler initialization time and appointment booking wait-time.

In some examples, a system includes one or more computers configured to schedule jobs based on travel from a geographic origin to a respective geographic job location for each job. The system also includes a one-to-many path searcher implemented on the one or more computers. The one-to-many path searcher is configured to identify, in a graph of nodes corresponding to geographic locations and edges between nodes weighted by travel costs between the geographic locations, an origin node corresponding to the geographic origin and destination nodes corresponding to the geographic job locations. The one-to-many path searcher is configured to search for paths along edges of the graph from the origin node to the destination nodes by traversing intermediate nodes between the origin node and the destination nodes using the travel costs, including determining, at each intermediate node of at least a subset of the intermediate nodes, a heuristic travel cost based on a geographic distance between an intermediate geographic location corresponding to the intermediate node and a boundary that initially surrounds the geographic job locations. The one-to-many path searcher is configured to, in response to finding one of the destination nodes, adjust the boundary so that the boundary surrounds the geographic job locations except for a found geographic location corresponding to the one of the destination nodes, and continue searching and adjusting the boundary until finding all of the destination nodes.

In some examples, the one-to-many path searcher determines the geographic distance between the intermediate geographic location and the boundary as a shortest straight line distance between the intermediate geographic location and the boundary. In some examples, the boundary that initially surrounds the geographic job locations comprises a rectangle, and the one-to-many path searcher determines, before starting searching, the boundary by determining a set of destination nodes that includes, for each of four cardinal directions, a respective boundary edge destination node having a geographic job location furthest from the geographic origin in the cardinal direction. Adjust the boundary can include adjusting the boundary only in response to finding one of the boundary edge destination nodes.

In some examples, traversing the intermediate nodes comprises storing, at each intermediate node, an actual travel cost of traversing the graph from the origin node to the intermediate node. In some examples, traversing the intermediate nodes comprises, at a first intermediate node, determining, for one or more neighboring nodes of the first intermediate node, a total cost estimate based on the actual travel cost to first intermediate node and the heuristic travel cost for the first intermediate node. In some examples, traversing the intermediate nodes comprises selecting a second intermediate node from the one or more neighboring nodes having a lowest total cost estimate, and traversing the graph to the second intermediate node. In some examples, searching for paths comprises determining the heuristic travel cost while traversing the intermediate nodes only when geographic origin is outside the boundary.

In some examples, the graph represents a road network, the edges represent roads between geographic locations, the nodes represent road intersections, and the travel costs represent estimated travel times along roads between road intersections. In some examples, the one or more computers are configured to schedule the plurality of jobs by scheduling first a first job having a lowest travel cost as determined by the one-to-many path searcher and then searching using the one-to-many path searcher with a first geographic location of the first job as the geographic origin, and then repeating the scheduling until all of the jobs have been scheduled and supplying a schedule to a user based on the scheduling.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by one or more processors of a computer cause the computer to perform operations.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
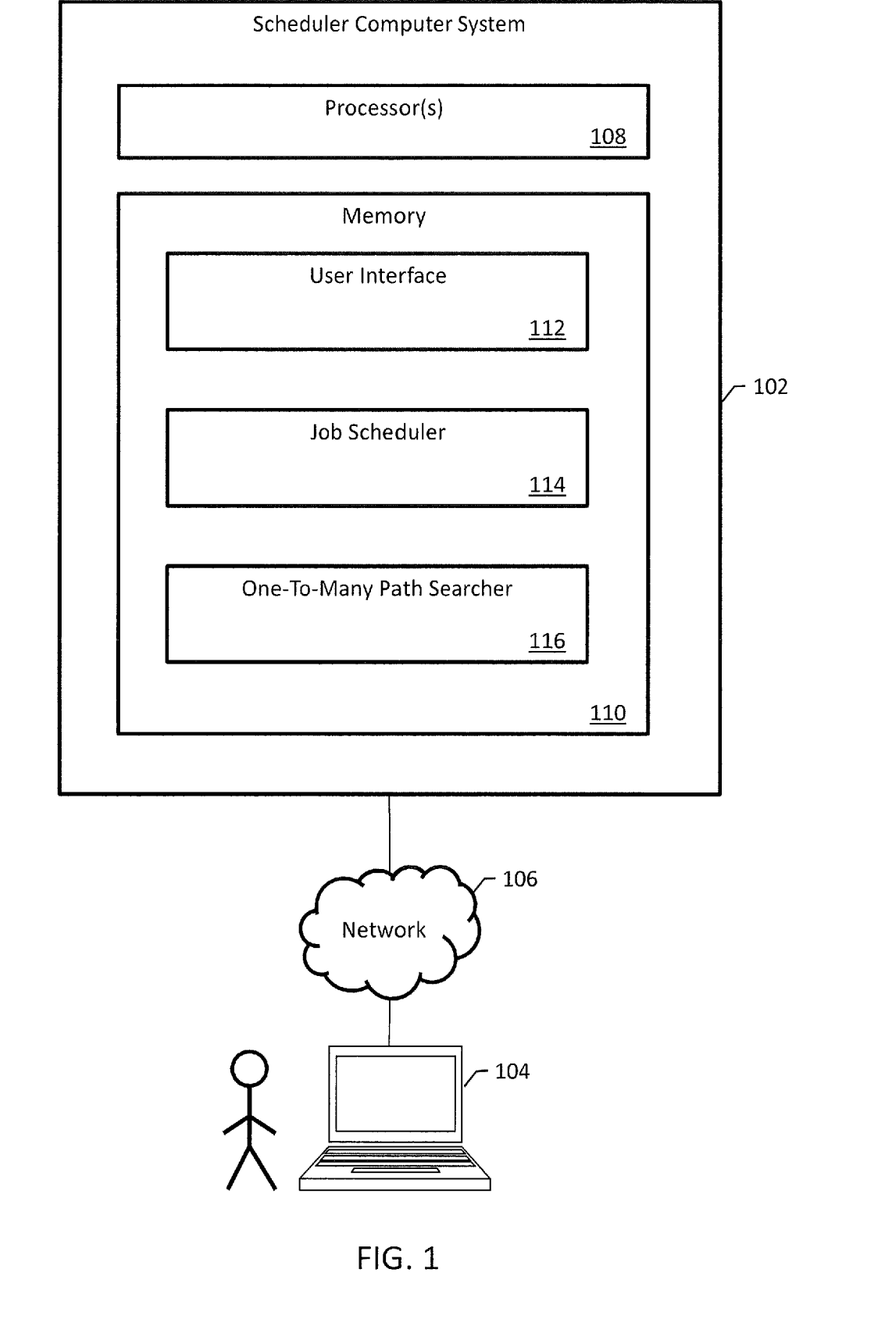
FIG. 1 is a block diagram of an example scheduler computer system.

FIG. 1 is a block diagram of an example scheduler computer system 102. Scheduler computer system 102 communicates with at least one user device 104 over a data communications network 106, e.g., the Internet. Scheduler computer system 102 includes one or more processors 108 and memory 110 storing instructions that, when executed by processors 108, cause processors 108 to schedule jobs based on travel from a geographic origin to geographic job locations. Memory 110 can store program modules including a user interface 112, a job schedule 114, and a one-to-many path searcher 116.

In operation, scheduler computer system 102 schedules jobs and can provide various other software services, for example, business services related to scheduling and planning. In some examples, scheduler computer system 102 features a modular, configurable design that allows a business customer to choose components that meet unique business requirements. The configurability of scheduler computer system 102 enables it to be deployed in a broad range of supply chain sectors such as home delivery, field service and facilities management.

For example, scheduler computer system 102 can be used for tasks in service delivery businesses ranging from capacity planning, through vehicle, technician and customer scheduling, to dispatch management and mobile operations. Scheduler computer system 102 can be used by a service delivery business to increase operational efficiency and customer satisfaction, for example by using features to:

Increase operations and dispatch management efficiency through better planning tools and automation of many field and resource communications tasks;

Increase resource efficiency through better distribution of workload, minimizing mileage driven and optimally redistributing jobs within the day based on real-time updates; and "One-touch" scheduling and proactive exception management to minimize late arrivals and customer notifications.

Scheduler computer system 102 can be used to accommodate business objectives, such as prioritizing emergency jobs, automatically notifying customers of cancellations, and efficiently rescheduling their service delivery appointments. In some examples, scheduler computer system 102 provides a real-time view into which mobile resources are currently available and where they are located, for booking service or delivery appointments while customers are on the phone. In some examples, scheduler computer system 102 is configured to minimize travel time to save fuel costs and vehicle wear and tear. Scheduler computer system 102 can be configured to assign field technicians to service calls according to their specific skills and qualifications. Scheduler computer system 102 can be configured to report on the status of deliveries and service calls in real time, to keep customers informed of any delays or cancellations.

Scheduler computer system 102 can be implemented as a server, for example, a server that provides cloud computing services to user device 104. User device 104 can be any appropriate computer system that includes a display and a user input device. For example, user device 104 can be a personal computer, a smart phone, or a tablet.

The user can use, for example, a web browser executing on user device 104 to interact with user interface 112. The user can enter a uniform resource locator (URL) for a web page hosted by scheduler computer system 102, and scheduler computer system 102 can provide user interface 112 to user device 104 to interact with the user. User interface 112 can be implemented using any appropriate user interface technology, e.g., hypertext markup language (HTML) or Asynchronous Java and XML (AJAX).

The user supplies information to job scheduler 114 using user interface 112. The information supplied includes information that job scheduler 114 can use to identify geographic job locations for a number of jobs. For example, the user can supply a file with a list of addresses or direct job scheduler 114 to another server that can supply a list of addresses or other information that can be used to determine geographic job locations for the jobs, e.g., business names. The information supplied can include other optional information, e.g., information characterizing available times for scheduling jobs or other scheduling restrictions. Job scheduler 114 is described further below with reference to FIG. 2.

Job scheduler 114 uses one-to-many path searcher 116 to determine travel costs of travelling to each of the geographic job locations for a geographic origin. The geographic origin can be the geographic job location for one of the jobs. The travel costs can be, e.g., estimated travel time, travel distance, estimated cost, estimated fuel consumption, or a combination of factors. For example, the travel costs can be based on car or truck travel over a road network, or rail travel over a network of railroads.

One-to-many path searcher 116 is configured to identify, in a graph of nodes corresponding to geographic locations and edges between nodes weighted by travel costs between the geographic locations, an origin node corresponding to the geographic origin and destination nodes corresponding to the geographic job locations. One-to-many path searcher 116 is configured to search for paths along edges of the graph from the origin node to the destination nodes by traversing intermediate nodes between the origin node and the destination nodes using the travel costs.

Traversing intermediate nodes includes determining, at each intermediate node of at least a subset of the intermediate nodes, a heuristic travel cost based on a geographic distance between an intermediate geographic location corresponding to the intermediate node and a boundary that initially surrounds the geographic job locations. One-to-many path searcher 116 is configured to, in response to finding one of the destination nodes, adjust the boundary so that the boundary surrounds the geographic job locations except for a found geographic location corresponding to the one of the destination nodes. One-to-many path searcher 116 continues searching and adjusting the boundary until finding all of the destination nodes. One-to-many path searcher 116 is described further below with reference to FIG. 3.

Figure 2:
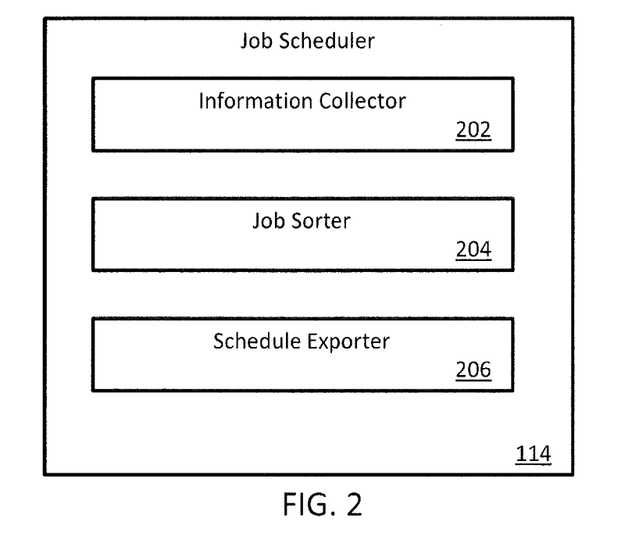
FIG. 2 is a block diagram of an example job scheduler.

FIG. 2 is a block diagram of an example job scheduler 114. Job scheduler 114 includes an information collector 202, a job sorter 204, and a scheduler exporter 206.

Information collector 202 is configured to receive information, e.g., from user device 104, for job scheduling. The information includes information that job scheduler 114 can use to identify geographic job locations for a number of jobs. For example, information collector 202 can receive a file with a list of addresses. Information collector 202 can communicate with a server that can supply a list of addresses or other information that can be used to determine geographic job locations for the jobs, e.g., business names.

For example, suppose that a user is scheduling a number of deliveries. Information collector 202 can receive, for each delivery, either an address or a name of a business that can be used to look up an address. In some examples, information collector 202 translates business names into addresses or translates addresses into precise location data, e.g., latitude and longitude data or global positioning system (GPS) coordinates.

The information supplied can include other optional information, e.g., information characterizing available times for scheduling jobs or other scheduling restrictions. For example, information collector 202 can receive a calendar file or data specifying normal business hours. In another example, information characterizer can receive preference information, e.g., indicating a preference for travel on local roads or for sorting jobs based on distance instead of estimated travel time.

For example, consider the example where a user is scheduling a number of deliveries. The delivery driver is available Monday-Thursday from 9-3. The user can upload a calendar file with those dates, or the user can use a calendar widget implemented in user interface 112 to specify the available delivery times for the delivery jobs.

Job sorter 204 is configured to sort jobs into an order for scheduling. Job sorter 204 uses one-to-many path searcher 116 to determine travel costs associated with each job. Job sorter 204 can then sort a number of jobs based on travel costs, e.g., in an order from lowest travel costs to highest travel costs and in an order of available time slots for jobs in the user's schedule.

For example, consider the example where a user is scheduling a number of deliveries. Job sorter 204 uses one-to-many path searcher 116 to determine that a first delivery location has the lowest travel cost from a delivery origin, e.g., a warehouse. Job sorter 204 schedules the first delivery location in an earliest available time slot for the user.

Then job sorter 204 removes the first delivery location from a list of deliveries to be scheduled and supplies the remaining delivery locations to one-to-many path searcher 116 with the first delivery location as the origin. Job sorter 204 determines, using one-to-many path searcher 116, that a second delivery location has the lowest travel cost and schedules the second delivery location in the next available time slot for the user. Job sorter 204 repeats the process until all of the jobs have been scheduled or another end condition is reached.

Schedule exporter 206 outputs the results of job sorter 204. For example, schedule exporter 206 can format a calendar file of the scheduled jobs and transmit the calendar file to user device 104. In another example, scheduler exporter 206 formats the scheduled jobs for presentation in a calendar widget implemented by user interface 112.

Schedule exporter 206 can be customized to meet the needs of a particular business. For example, consider the example where the user is scheduling a number of deliveries. Schedule exporter 206 can transmit the schedule to a computer system at a warehouse and to a mobile computer on a delivery truck. Workers at the warehouse can begin preparing goods for delivery, and the delivery truck can use the schedule to plot directions for a driver of the truck.

Figure 3:
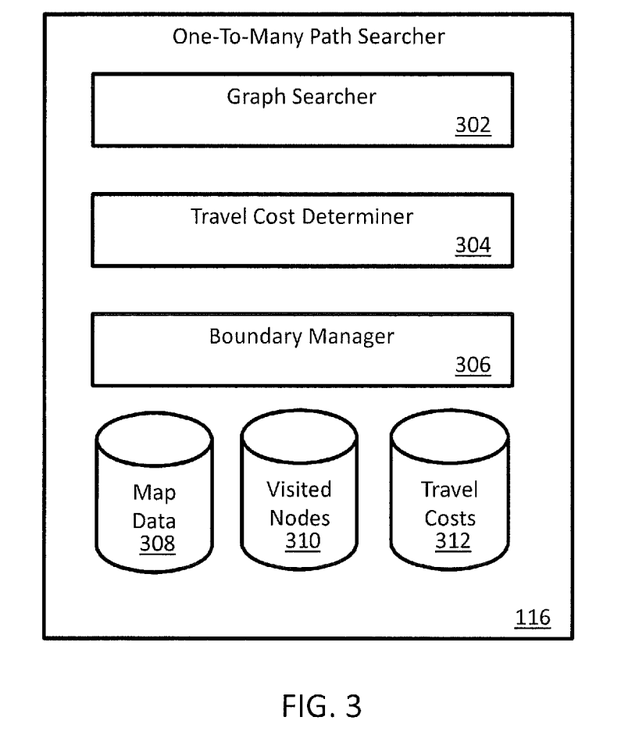
FIG. 3 is a block diagram of an example one-to-many path searcher.

FIG. 3 is a block diagram of an example one-to-many path searcher 116. One-to-many path searcher 116 includes a graph searcher 302, a travel cost determiner 304, and a boundary manager 306. One-to-many path searcher 116 stores various data for use in searching for paths, including map data 308, visited nodes data 310, and travel cost data 312.

Graph searcher 302 is configured to use a graph to search for paths from a geographic origin to geographic job locations for a number of jobs. Graph searcher 302 creates or receives a graph that includes nodes and edges between the nodes. The nodes correspond to geographic locations. The edges are weighted by travel costs between the geographic locations that correspond to the nodes.

For example, suppose that one-to-many path searcher 116 is searching for paths for a delivery truck to drive over a road network. The graph can represent the road network. The edges represent roads between geographic locations. The nodes represent road intersections. The travel costs can represent estimated travel times along roads between road intersections, or other travel costs such as distance. Graph searcher 302 can use map data 308 to construct the graph.

Graph searcher 302 identifies, in the graph, an origin node corresponding to a geographic origin of a number of jobs and destination nodes corresponding to geographic job locations. Graph searcher 302 is configured to search for paths along edges of the graph from the origin node to the destination nodes by traversing intermediate nodes between the origin node and the destination nodes using the travel costs. Traversing intermediate nodes includes visiting neighboring nodes from a current node and determining travel costs for the neighboring nodes and tracking travel costs and visited nodes in a visited nodes database 310 and a travel costs database 312.

For example, graph searcher 302 can use elements of Dijkstra's algorithm, elements of the A* algorithm, or elements of other graph searching algorithms to traverse intermediate nodes. Travel cost determiner 304 determines travel costs at each node. Travel costs can include actual costs, as determined by traversing the graph, and heuristic travel costs based on a geographic distance between an intermediate geographic location corresponding to an intermediate node and a boundary. Travel cost determiner 304 can determine the shortest straight line distance between the intermediate geographic location and the boundary.

Boundary manager 306 initializes the boundary and adjusts the boundary as graph searcher 302 traverses the graph. The boundary initially (i.e., before graph searcher 302 begins traversing intermediate nodes) surrounds all of the geographic job locations. Some of the geographic job locations may be located on the boundary; as used in this document, the boundary "surrounds" such edge locations. Then, as graph searcher 302 visits destination nodes, boundary manager 306 adjusts the boundary in response to visiting destination nodes so that the boundary only surrounds the remaining, unvisited destination nodes.

Typically, graph searcher 302 determines the heuristic travel cost using the boundary only when the geographic origin is outside the boundary. When the geographic origin is inside the boundary, using the heuristic travel cost may not be likely to provide a benefit since there are unvisited destination nodes in all directions from the geographic origin. Determining the heuristic travel cost using the boundary only when the geographic origin is outside the boundary can save computing resources and reduce the time used by one-to-many path searcher 116.

The boundary can be any appropriate shape, e.g., a rectangle or an oval. In some examples, boundary manager 306 determines the boundary, before starting searching, by determining a set of boundary edge destination nodes. The set of boundary edge destination nodes includes, for each of four cardinal directions, a respective boundary edge destination node having a geographic job location furthest from the geographic origin in the cardinal direction.

For example, the boundary edge destination nodes can include up to four boundary edge destination nodes for east, west, north and south. Boundary manager 306 then initializes the boundary as having four sides at the farthest locations of geographic job locations. As described in this document, the boundary is described as initially "surrounding" the boundary edge destination nodes even though they are on the edges of the boundary.

In some examples, boundary manager 306 only adjusts the boundary in response to visiting one of the boundary edge destination nodes. This can reduce the computing overhead associated with adjusting the boundary by avoiding adjusting the boundary any time a destination node is visited. For destination nodes not on the boundary edges, no boundary adjustment is needed since the boundary will still have to extend as far as the boundary edge nodes.

Traversing the intermediate nodes includes storing, at each intermediate node, an actual travel cost of traversing the graph from the origin node to the intermediate node. For example, traversing the intermediate nodes can include, at a first intermediate node, determining, for one or more neighboring nodes of the first intermediate node, a total cost estimate based on the actual travel cost to first intermediate node and the heuristic travel cost for the first intermediate node. Traversing the intermediate node can then include selecting a second intermediate node from the one or more neighboring nodes having a lowest total cost estimate, and traversing the graph to the second intermediate node. Searching the graph and traversing intermediate nodes is described further below with reference to FIGS. 4A-D and FIG. 5.

FIGS. 4A-D are charts illustrating an example scenario of path searching to three example geographic job locations. FIGS. 4A-D depict four geographic locations, A, B, C, and O, in an X-Y coordinate space. The geographic locations are represented by nodes in a graph and routes between the geographic locations are represented by edges between the nodes in the graph weighted by travel costs. One-to-many path searcher 116 is configured to find routes having the lowest costs from the origin geographic location, O, to geographic job locations A, B, and C.

Figure 4A:
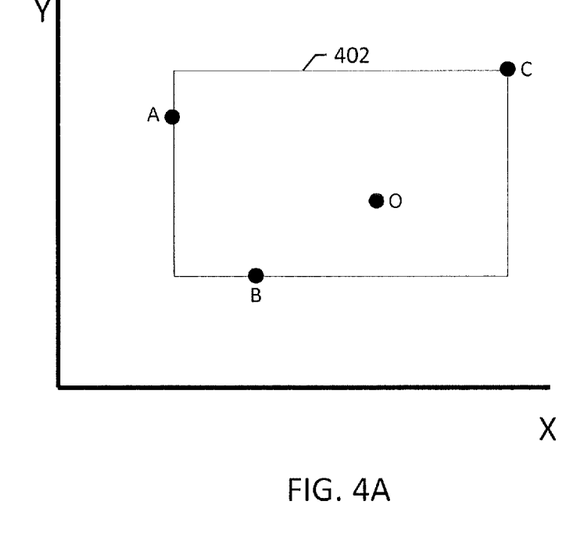
FIGS. 4A-D are charts illustrating an example scenario of path searching to three example geographic job locations.

In FIG. 4A, one-to-many path searcher 116 creates a boundary 402 that surrounds the geographic job locations A, B, and C. Boundary 402 is created in computer memory and is not an actual physical boundary. Initially, boundary 402 also surrounds the geographic origin O, so one-to-many path searcher 116 will not use boundary 402 as it begins searching for routes by traversing the graph.

As one-to-many path searcher 116 traverses the graph, it essentially searches outward in all directions from the geographic origin. As one-to-many path searcher 116 visits destination nodes corresponding to the geographic job locations, one-to-many path searcher 116 will adjust boundary 402 and use boundary 402 to focus the searching towards the remaining, unvisited destination nodes to hopefully reduce the search time and the computing resources used in searching.

Figure 4B:
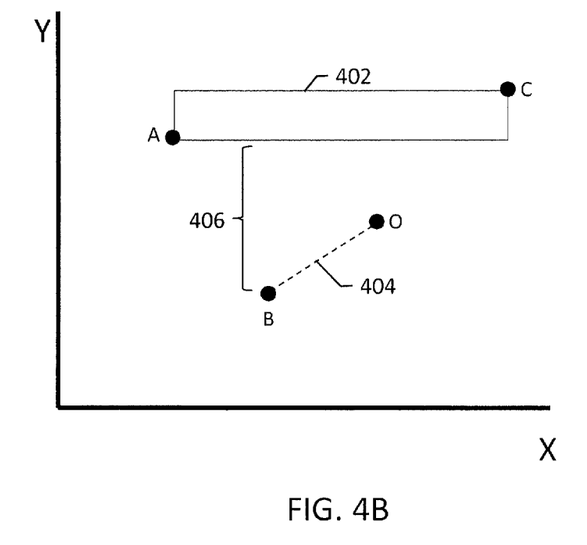

In FIG. 4B, one-to-many path searcher 116 finds a route 404 between geographic origin O and geographic job location B. One-to-many path searcher 116 visits the destination node in the graph corresponding to geographic job location B. One-to-many path searcher 116 assigns a tentative actual travel cost to geographic job location B based on route 404.

To determine the heuristic travel cost to the remaining unvisited geographic job locations, one-to-many path searcher 116 adjusts boundary 402 to surround geographic job locations A and C and not B. Since the geographic origin O is no longer inside boundary 402, one-to-many path searcher 116 can use boundary 402 to determine heuristic travel costs. To determine the heuristic travel cost for geographic job location B, one-to-many path searcher 116 determines a distance 406 from geographic job location B to boundary 402.

For example, distance 406 can be the shortest straight line distance to boundary 402. One-to-many path searcher 116 can use any appropriate algorithm for determining the shortest straight line distance. For example, since boundary 402 is a rectangle and B is between A and C, one-to-many path searcher 116 can determine distance 406 by determining the distance along the Y axis between A and B. For other shapes of boundaries, one-to-many path searcher 116 may use another type of distance determining algorithm.

In some examples, one-to-many path searcher 116 can determine the heuristic travel cost by further processing of the distance. For example, suppose that one-to-many path searcher 116 is using estimated travel time as a travel cost.

One-to-many path searcher 116 can determine the heuristic travel cost as the estimated time to travel distance 406. The estimated time can be determined based on, e.g., a vehicle traveling at a maximum speed or average speed of the vehicle or a vehicle traveling at a maximum or average speed on the fastest type of route, e.g., a highway. The estimated time can be determined by dividing distance 406 by the speed.

Figure 4C:
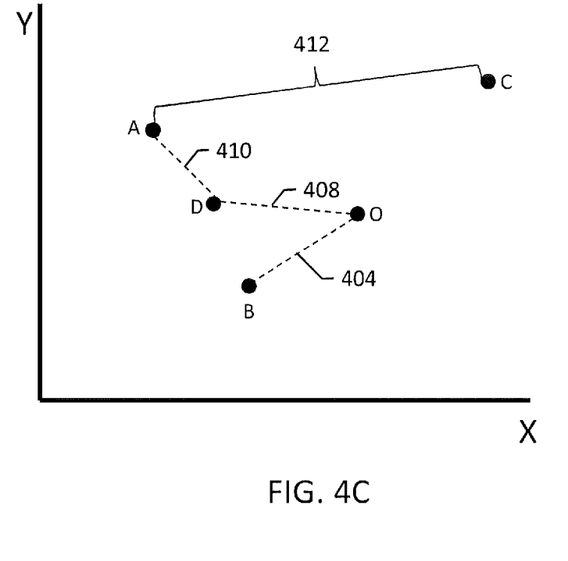

In FIG. 4C, one-to-many path searcher 116 finds a route between geographic origin O and geographic job location A. The route includes traversing two routes 408 and 410 past an intermediate location, D. One-to-many path searcher 116 assigns a tentative actual travel cost to geographic job location A based on routes 408 and 410.

To determine the heuristic travel cost to the remaining unvisited geographic job locations, one-to-many path searcher 116 adjusts boundary 402 to surround geographic job location C. Since C is the only remaining unvisited geographic job location, boundary 402 collapses to a single point at geographic job location C. To determine the heuristic travel cost for geographic job location A, one-to-many path searcher 116 determines a distance 412 from geographic job location A to geographic job location C.

Figure 4D:
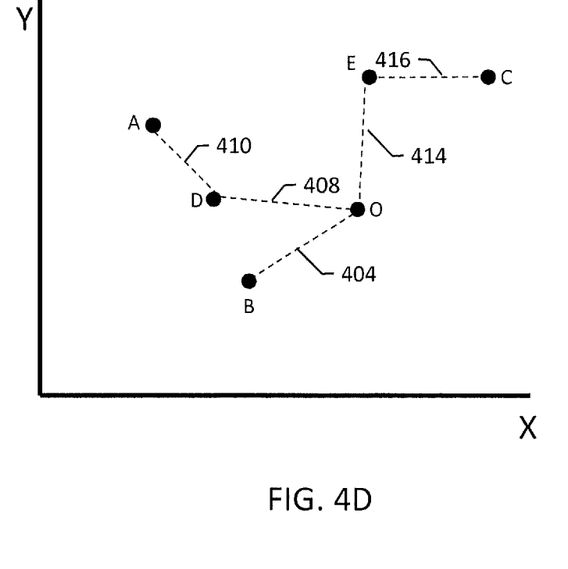

In FIG. 4D, one-to-many path searcher 116 finds a route between geographic origin O and geographic job location C. The route includes traversing two routes 414 and 416 past an intermediate location, E. One-to-many path searcher 116 assigns a tentative actual travel cost to geographic job location C based on routes 414 and 416. One-to-many path searcher 116 can continue searching for better routes to the geographic job locations until an end condition is reached, e.g., as described further below with reference to FIG. 6. Then job scheduler 114 can schedule jobs based on the actual travel costs to the geographic job locations.

Although only three geographic job locations are illustrated in FIGS. 4A-D, in some cases, one-to-many path searcher 116 may have to search for large numbers of job locations over vast areas with many possible paths. In those cases, using heuristic travel costs to guide one-to-many path searcher 116 can greatly reduce the time required to complete the searching and reduce the computing resources used in completing the search.

Figure 5:
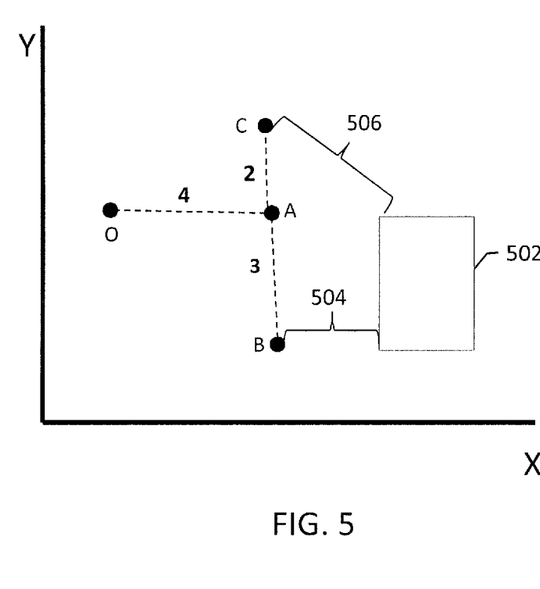
FIG. 5 is a chart illustrating an example scenario of determining heuristic travel costs at an intermediate node while traversing a graph.

FIG. 5 is a chart illustrating an example scenario of determining a heuristic travel cost at an intermediate node while traversing a graph. In this scenario, one-to-many path searcher has traversed the graph from a node for geographic origin O to a node for an intermediate geographic location A. One-to-many path searcher assigns a tentative actual travel cost of 4 to that node based on the route from O to A.

In visiting the node for A, one-to-many path searcher 116 determines that the node for A has two neighbor nodes for geographic job locations B and C. One-to-many path searcher 116 assigns a tentative actual travel cost of 7 to B based on the sum of the tentative actual travel cost to A (4) and the travel cost from A to B (3). One-to-many path searcher 116 assigns a tentative actual travel cost of 6 to C based on the sum of the tentative actual travel cost to A (4) and the travel cost from A to C (2).

One-to-many path searcher 116 then assigns heuristic travel costs to the nodes for B and C based on distances 504 and 506 to a boundary 502 that surrounds the remaining geographic job locations. One-to-many path searcher 116 can then sum, for each of the neighbor nodes B and C, the tentative actual travel cost with the heuristic travel cost to determine a tentative total travel cost for each neighbor node. One-to-many path searcher 116 can determine which node to visit next based on the tentative total travel costs, e.g., one-to-many path searcher 116 can next visit the node having the lowest tentative total travel cost.

For example, suppose that distance 504 has a value of 2, so that node B has a tentative total travel cost of 9. Further suppose that distance 506 has a value of 4, so that the node for C has a tentative total travel cost of 10. One-to-many path searcher 116 may visit the node for B before visiting the node for C since the node for B has a lower tentative total travel cost.

In that example, one-to-many path searcher 116 may visit the node for B before visiting the node for C even though the node for C has a lower tentative actual travel cost (6 for C versus 7 for B). Using the heuristic travel cost can guide one-to-many path searcher 116 to traverse the graph by moving towards geographic locations closer to the remaining job locations within boundary 502. Guiding one-to-many path searcher 116 towards boundary 502 may reduce the total time needed to search the graph for paths between the geographic origin O and the geographic job locations.

In some cases, using the heuristic travel costs may not result in a reduced search time. For example, this may happen where the geographic origin O is in or near the center of a number of geographic job locations. In this case, there is no benefit to maintaining the boundary. So the search time may, in some cases, increase compared to a similar search that does not use the heuristic travel cost since such a similar search would avoid the computing overhead of maintaining the boundary.

Testing one-to-many path searcher 116 on various example searches and datasets can be useful to determine whether heuristic travel costs should be used for a given system. In some cases, one-to-many path searcher 116 can be configured to use the heuristic travel costs only in certain situations, e.g., when searching within certain geographic areas or searching in marked datasets.

Figure 6:
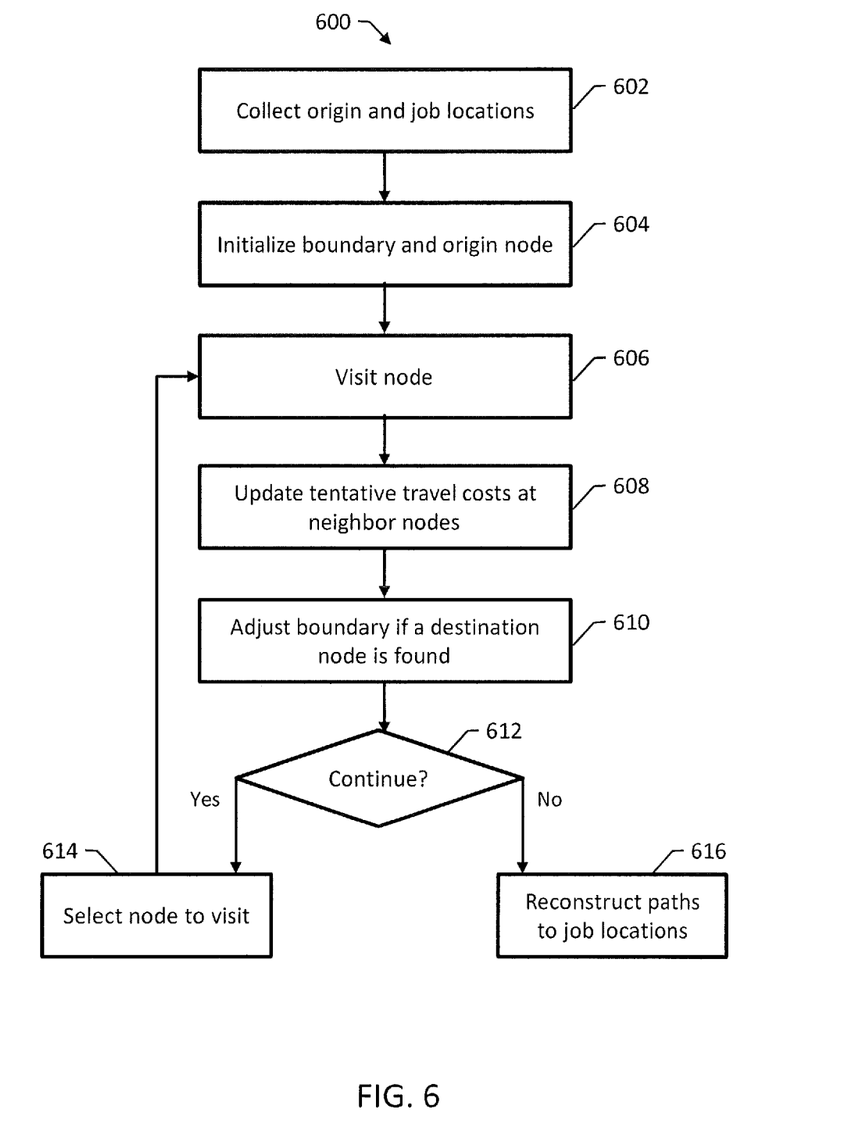
FIG. 6 is a flow diagram of an example method 600 for scheduling jobs based on travel from a geographic origin to geographic job locations using a one-to-many path searcher.

FIG. 6 is a flow diagram of an example method 600 for scheduling jobs based on travel from a geographic origin to geographic job locations using a one-to-many path searcher. Method 600 can be performed by a system of one or more computers. For purposes of illustration, method 600 will be described with respect to a system that performs method 600.

The system collects geographic locations for a geographic origin and for a number of geographic job locations (602). For example, the system can collect the information as described above with reference to information collector 202 of FIG. 2.

The system initializes a boundary that surrounds the geographic job locations and identifies, in a graph of nodes corresponding to geographic locations and edges between nodes weighted by travel costs between the geographic locations, an origin node corresponding to the geographic origin (604). The graph can represent, e.g., a road network or a network of routes for airplanes or trains or other vehicles. The nodes then represent intersections, airports, or train stations, and the edges represent roads, flight paths, or train tracks.

The other nodes are initially marked as unvisited, for example, by assigning a tentative travel cost of ∞ to each of those nodes. The boundary can be a rectangle or any appropriate shape.

The system begins traversing the graph by first visiting the node for the geographic origin (606). The system identifies the neighbor nodes of the node for the geographic origin and then updates tentative travel costs at each of the neighbor nodes. For each neighbor node, the system determines a tentative actual travel cost. If the geographic origin is not within the boundary, the system determines a heuristic travel cost based on a distance from the neighbor node to the boundary.

For example, the system can determine the shortest straight line distance from the neighbor node to the boundary. The system determines the tentative travel cost for the neighbor node based on the tentative actual travel cost and the heuristic travel cost.

At this point, the travel costs at each node are tentative because it is possible that the system will later discover a better route to the neighbor node. If the system does later discover a better route, the system will replace the tentative travel cost of the node with the travel cost of using the later-discovered better route.

The system adjusts the boundary if a destination node is found (610). The system adjusts the boundary so that it surrounds the remaining, unvisited geographic job locations. For example, the system can adjust the boundary as described above with reference to boundary manager 306 of FIG. 3.

The system determines whether to continue traversing the graph by determining whether an end condition has been reached (612). Typically, the end condition is reached when the system has visited nodes for each of the geographic job locations and when it is impossible that any further searching will yield a better path to any of the geographic job locations. In some examples, the end condition can also include a time limit or other condition for stopping the search.

The system determines that no further searching will yield a better path by comparing the tentative total cost of travel to the geographic job locations to the tentative total cost of travel to each of the visited nodes. If any of the visited nodes has a tentative total cost of travel lower than the current total cost of travel to any of the geographic job locations, then the end condition has not been reached and the system will visit those nodes to determine whether they will yield a better path. If none of the visited nodes has a tentative total cost of travel that can yield a better path, then the system can stop searching.

For example, the system can maintain a priority queue of nodes to be traversed. Nodes with lower tentative total travel costs are given higher priority in the queue. As the system traverses the graph, the system can remove the node with the lowest total travel cost from the queue, visit the neighbor nodes of the removed node, and then add the neighbor nodes to the queue.

Then the system can continue until all of the destination nodes have a lower total travel cost than any node in the queue or the queue is empty. In some cases, destination nodes may be passed over multiple times if there remain other nodes with lower total travel costs, as they may yet yield a better path.

If the system determines to continue searching, then the system selects the next node to visit (614) and then visits that node (return to 606). For example, the system can select one of the neighbor nodes based on the tentative total costs assigned to the neighbor nodes. If the system determines not to continue searching, then the system can optionally find the actual paths to one or more of the geographic job locations by reconstructing paths to those geographic job locations (616).

For example, if job scheduler 114 schedules a job at one of the geographic job locations as a first job, then the system can reconstruct the best path to that geographic job location using the graph and the travel costs determined while searching the graph. In some examples, the system is configured so that, while searching, each node on the path keeps track of its processor. Then, the path can be reconstructed quickly since the destination node will indicate its predecessor and the nodes can be traversed backwards through the graph to determine the path. This can be useful, e.g., to provide directions to a user along with a schedule resulting from the searching and job scheduling.

The system continues scheduling and searching until each of the jobs have been scheduled and then supplies a schedule to a user based on the schedule. The user can then follow the schedule by traveling, or causing someone else to travel, to each of the geographic job locations in the order specified by the schedule and possibly according to directions provided based on the graph used while searching.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The subject matter described herein can be implemented on general purpose computers that are appropriately programmed to become special purpose computers, such as road-mapping servers and job scheduling computer systems, and improves the functionality of such computers by reducing the time and computing resources used in job scheduling and one-to-many path searching between geographic job locations. Reducing the time used in one-to-many path searching can improve the availability of the servers and/or increase the output of the computers in terms of number of jobs scheduled or paths searched.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for reducing computation time in one-to-many path searching using heuristics and boundary adjustment comprising:
    one or more computers configured to schedule a plurality of jobs based on travel from a geographic origin to geographic job locations for respective jobs;
    an information collector implemented on the one or more computers and configured to translate addresses into the geographic job locations of latitude and longitude data;
    a one-to-many path searcher implemented on the one or more computers and configured to perform operations comprising:
        identifying, in a graph of a plurality of nodes corresponding to the geographic job locations and a plurality of edges between the nodes, an origin node corresponding to the geographic origin and a plurality of destination nodes corresponding to the geographic job locations, weighting the plurality of edges by travel costs representing a wear and tear of a vehicle traveling between the nodes, reducing computation time of the one or more computers by determining a heuristic travel cost only when the geographic origin is outside a boundary that initially surrounds the geographic job locations, searching paths along the edges of the graph from the origin node to the destination nodes by traversing a plurality of intermediate nodes between the origin node and the destination nodes using the travel costs, including determining, at each intermediate node of at least a subset of the intermediate nodes, the heuristic travel cost based on a geographic distance between an intermediate geographic location at each intermediate node and the boundary that initially surrounds the geographic job locations, finding, while searching the paths along the edges of the graph from the origin node to the destination nodes, a first destination node of the plurality of destination nodes, reducing additional computation time of the one or more computers by adjusting the boundary only when visiting one of the destination nodes along the boundary's edge to avoid adjusting the boundary each time any of the destination nodes that is not on the boundary edges is visited, in response to finding the first destination node along the boundary's edge, further adjusting the boundary so that the boundary surrounds the geographic job locations except for a found geographic location corresponding to the first destination node, and continuing searching and further adjusting the boundary until finding all of the destination nodes, wherein the adjusting of the boundary comprises shrinking the boundary so that the boundary surrounds one or more remaining unfound nodes and excludes the first destination node; and a scheduler exporter implemented on the one or more computers for formatting a calendar file of the jobs and for exporting the calendar file to a user device to prompt a user to travel from the geographic origin to each of the geographic job locations based on the searching for the paths, including scheduling a first job having a lowest travel cost as determined by the one-to-many path searcher and then searching using the one-to-many path searcher a first geographic location of the first job as the geographic origin, and then repeating the scheduling until all of the jobs have been scheduled.

2. The system of claim 1, wherein the operations comprise determining the geographic distance between the intermediate geographic location and the boundary as a shortest straight line distance between the intermediate geographic location and the boundary.

3. The system of claim 1, wherein the boundary that initially surrounds the geographic job locations comprises a rectangle, and wherein the operations comprise determining, before starting the searching, the boundary by determining a set of the destination nodes that includes, for each of four cardinal directions, a respective boundary edge destination node having a geographic job location furthest from the geographic origin in one of the four cardinal directions.

4. The system of claim 3, wherein adjusting the boundary comprises adjusting the boundary only in response to finding one of the boundary edge destination nodes.

5. The system of claim 1, wherein traversing the intermediate nodes comprises storing, at each intermediate node, an actual travel cost of traversing the graph from the origin node to the intermediate node.

6. The system of claim 5, wherein traversing the intermediate nodes comprises, at a first intermediate node, determining, for one or more neighboring nodes of the first intermediate node, a total cost estimate based on the actual travel cost to first intermediate node and the heuristic travel cost for the first intermediate node.

7. The system of claim 6, wherein traversing the intermediate nodes further comprises selecting a second intermediate node from the one or more neighboring nodes having a lowest total cost estimate, and traversing the graph to the second intermediate node.

8. The system of claim 1, wherein searching the paths comprises determining the heuristic travel cost while traversing the intermediate nodes only when geographic origin is outside the boundary.

9. The system of claim 1, wherein the graph represents a road network, the edges represent roads between the geographic locations, the nodes represent road intersections, and the travel costs represent estimated travel times along roads between road intersections.

10. A method for reducing computation time in one-to-many path searching using heuristics and boundary adjustment the method comprising:

scheduling, by one or more computers, a plurality of jobs based on travel from a geographic origin to geographic job locations for respective jobs;

translating, by the one or more computers, addresses into the geographic job locations of latitude and longitude data;

identifying, by the one or more computers, in a graph of a plurality of nodes corresponding to the geographic job locations and a plurality of edges between the nodes, an origin node corresponding to the geographic origin and a plurality of destination nodes corresponding to the geographic job locations;

weighting, by the one or more computers, the plurality of edges by travel costs representing a wear and tear of a vehicle traveling between the nodes;

reducing computation time of the one or more computers by determining a heuristic travel cost only when the geographic origin is outside a boundary that initially surrounds the geographic job locations;

searching, by the one or more computers, paths along the edges of the graph from the origin node to the destination nodes by traversing a plurality of intermediate nodes between the origin node and the destination nodes using the travel costs, including determining, at each intermediate node of at least a subset of the intermediate nodes, the heuristic travel cost based on a geographic distance between an intermediate geographic location corresponding to at each intermediate node and the boundary that initially surrounds the geographic job locations;

finding, by the one or more computers, while searching the paths along the edges of the graph from the origin node to the destination nodes, a first destination node of the plurality of destination nodes;

reducing additional computation time of the one or more computers by adjusting the boundary only when visiting one of the destination nodes along the boundary's edge to avoid adjusting the boundary each time any of the destination nodes that is not on the boundary edges is visited;

in response to finding the first destination node, along the boundary's edge, further adjusting, by the one or more computers, the boundary so that the boundary surrounds the geographic job locations except for a found geographic location corresponding to the first destination node, and continuing searching and further adjusting the boundary until finding all of the destination nodes, wherein the adjusting of the boundary comprises shrinking the boundary so that the boundary surrounds one or more remaining unfound nodes and excludes the first destination node;

formatting, by the one or more computers, a calendar file of the jobs; and exporting, by the one or more computers, the calendar file to a user device to prompt a user to travel from the geographic origin to each of the geographic job locations based on the searching for the paths, including scheduling a first job having a lowest travel cost as determined by the one-to-many path searcher and then searching using the one-to-many path searcher a first geographic location of the first job as the geographic origin, and then repeating the scheduling until all of the jobs have been scheduled.

11. The method of claim 10, comprising determining the geographic distance between the intermediate geographic location and the boundary as a shortest straight line distance between the intermediate geographic location and the boundary.

12. The method of claim 10, wherein the boundary that initially surrounds the geographic job locations comprises a rectangle, and wherein the method further comprises determining, before starting the searching, the boundary by determining a set of the destination nodes that includes, for each of four cardinal directions, a respective boundary edge destination node having a geographic job location furthest from the geographic origin in one of the four cardinal directions.

13. The method of claim 12, wherein adjusting the boundary comprises adjusting the boundary only in response to finding one of the boundary edge destination nodes.

14. The method of claim 10, wherein traversing the intermediate nodes comprises storing, at each intermediate node, an actual travel cost of traversing the graph from the origin node to the intermediate node.

15. The method of claim 14, wherein traversing the intermediate nodes comprises, at a first intermediate node, determining, for one or more neighboring nodes of the first intermediate node, a total cost estimate based on the actual travel cost to first intermediate node and the heuristic travel cost for the first intermediate node.

16. The method of claim 15, wherein traversing the intermediate nodes further comprises selecting a second intermediate node from the one or more neighboring nodes having a lowest total cost estimate, and traversing the graph to the second intermediate node.

17. The method of claim 10, wherein searching the paths comprises determining the heuristic travel cost while traversing the intermediate nodes only when geographic origin is outside the boundary.

18. The method of claim 10, wherein the graph represents a road network, the edges represent roads between the geographic locations, the nodes represent road intersections, and the travel costs represent estimated travel times along roads between road intersections.

19. A non-transitory computer readable medium storing executable instructions that when executed by one or more computers cause the one or more computers to reduce computation time in one-to-many path searching using heuristics and boundary adjustment by performing operations comprising:

scheduling, a plurality of jobs based on travel from a geographic origin to geographic job locations for respective jobs;

translating, addresses into the geographic job locations of latitude and longitude data;

identifying, in a graph of a plurality of nodes corresponding to the geographic job locations and a plurality of edges between the nodes, an origin node corresponding to the geographic origin and a plurality of destination nodes corresponding to the geographic job locations;

weighting the plurality of edges by travel costs representing a wear and tear of a vehicle traveling between the nodes;

reducing computation time of the one or more computers by determining a heuristic travel cost only when the geographic origin is outside a boundary that initially surrounds the geographic job locations;

searching paths along the edges of the graph from the origin node to the destination nodes by traversing a plurality of intermediate nodes between the origin node and the destination nodes using the travel costs, including determining, at each intermediate node of at least a subset of the intermediate nodes, the heuristic travel cost based on a geographic distance between an intermediate geographic location at each intermediate node and the boundary that initially surrounds the geographic job locations;

finding, while searching the paths along the edges of the graph from the origin node to the destination nodes, a first destination node of the plurality of destination nodes;

reducing additional computation time of the one or more computers by adjusting the boundary only when visiting one of the destination nodes along the boundary's edge to avoid adjusting the boundary each time any of the destination nodes that is not on the boundary edges is visited;

in response to finding the first destination node along the boundary's edge, further adjusting the boundary so that the boundary surrounds the geographic job locations except for a found geographic location corresponding to the first destination node, and continuing searching and further adjusting the boundary until finding all of the destination nodes, wherein the adjusting of the boundary comprises shrinking the boundary so that the boundary surrounds one or more remaining unfound nodes and excludes the first destination node;

formatting a calendar file of the jobs; and exporting the calendar file to a user device to prompt a user to travel from the geographic origin to each of the geographic job locations based on the searching for the paths, including scheduling a first job having a lowest travel cost as determined by the one-to-many path searcher and then searching using the one-to-many path searcher a first geographic location of the first job as the geographic origin, and then repeating the scheduling until all of the jobs have been scheduled.

* * * * *

UNITED STATES PATENT AND TRADEMARK OFFICE
CERTIFICATE OF CORRECTION

PATENT NO. : 10,740,702 B2
APPLICATION NO. : 14/991557
DATED : August 11, 2020
INVENTOR(S) : Charles van't Westeinde It is certified that error appears in the above-identified patent and that said Letters Patent is hereby corrected as shown below:

On the Title Page

Item (54), please replace --METHOD, SYSTEM,-- with --METHODS, SYSTEMS,--.

Page 2, Column 2, Line 7, please replace --Alghorithm-- with --Algorithm--.

Page 2, Column 2, Line 20, please replace --Alghorithm-- with --Algorithm--.

Page 2, Column 2, Line 26, please replace --Carelton-- with --Carleton--.

Page 2, Column 2, Line 26, please replace --Ottowa,-- with --Ottawa,--.

In the Specification

Column 1, in the Title, please replace --METHOD, SYSTEM,-- with --METHODS, SYSTEMS,--.

In the Claims

Column 14, Claim 10, Line 58, please remove --corresponding to-- before --at each--.

Signed and Sealed this
Seventeenth Day of May, 2022

Katherine Kelly Vidal
*Director of the United States Patent and Trademark Office*